Oct. 6, 1936. O. E. W. OSENBERG 2,056,309
CLAMPING ARRANGEMENT ON METALLIC CONNECTING ELEMENTS
Filed Sept. 16, 1933
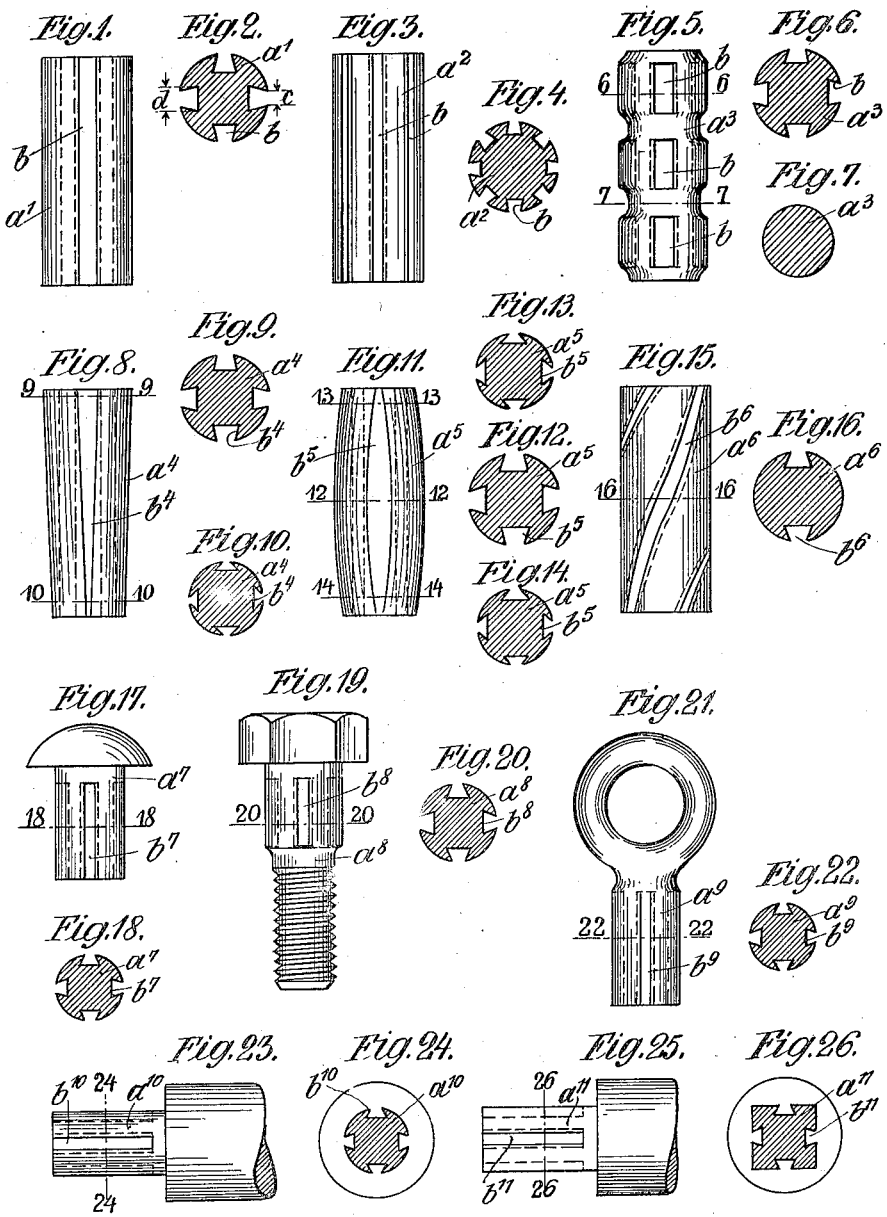
Inventor:
Oskar Ewald Werner Osenberg
by
Attorney Patented Oct. 6, 1936

2,056,309

UNITED STATES PATENT OFFICE 2,056,309

CLAMPING ARRANGEMENT ON METALLIC CONNECTING ELEMENTS

Oskar Ewald Werner Osenberg, Dresden, Germany

Application September 16, 1933, Serial No. 689,743
In Germany September 17, 1932

4 Claims. (Cl. 85—19)

This invention relates to metallic connecting elements, such as rivets, screws, shafts and the like, and concerns an arrangement thereon for producing a tighter clamping between the connecting elements and the metal parts to be connected. For this purpose the connecting element, according to the invention, has in its wall longitudinal grooves, the width of which is narrower on the surface of the wall than at the bottom of the grooves. The bottom of the grooves is the base thereof. The depth of the grooves is the portion of the radius of the bolt from the base of the grooves to the circumferential surface of the bolt. The width of the grooves is the distance between the two outer edges of the groove. Instead of milling these grooves, they are produced by first pressing, drawing or rolling into the connecting element grooves of rectangular or similar cross section having the same width at the base as at the surface of the wall. The material of the connecting elements is thus compressed, which prevents that the ultimate tensile strength and the shearing resistance of the connecting elements is detrimentally affected by the grooves. The remaining longitudinal strips of the wall surface are then pressed radially inwards, the edges of the grooves on the wall surface of the connecting element being thereby approached so that the width of the grooves on the wall surface is narrowed. The tools for pressing in the remaining longitudinal strips of the connecting element are so shaped that they do not alter the circumferential shape of the connecting element but only reduce the circumference.

In the connecting elements thus constructed according to the invention the outer edges of the grooves form, with the adjacent edges of the longitudinal portions of the bolt, oppositely disposed sharp longitudinal ribs defining sharp edged incisions extending longitudinally of the bolt and the longitudinal rib portions of the bolt remaining beside the grooves have a narrowed neck portion at the base of the grooves which is radially upset during pressing or driving of the connecting element in to a bore in the workpiece, so that the outer circumference of the connecting element is reduced and adapts itself to the hole diameter, the connecting element remaining connected with the hole wall under strong clamping pressure. These narrowed necks of the remaining wall strips can adapt themselves to a great deformation of the connecting element during the upsetting, and consequently the hole in the workpiece, into which the connecting element is driven, can be narrower within relatively wide limits than the circumference of the connecting element, and accordingly a very tight connection of the connecting element with the hole wall of the workpiece can be produced. Owing to the narrowed necks of the remaining wall strips of the connecting element this tight connection possesses a certain elasticity which is proved by the fact that the connecting element after having been removed again assumes a diameter or circumference which is slightly larger than the bore in the workpiece. Thus, destruction of the bore in the workpiece is avoided.

The connecting element may be hardened on its outer surface, as its deformation during the driving into the bore in the workpiece does not take place on the outer surface but in the lower situated upset neck portions of the remaining wall strips. Similarly, the outer surface of the connecting element may be roughened, provided with notches or transverse grooves, whereby the tightness of the connection with the hole wall of the workpiece is further increased.

The grooves may be arranged in different manners according to the object and shape of the connecting element.

Several embodiments of the invention are illustrated by way of example in the accompanying drawing in which:

Fig. 1 shows in elevation a cylindrical connecting bolt with four grooves.

Fig. 2 is a cross section of Fig. 1.

Fig. 3 shows in elevation a cylindrical connecting bolt with a larger number of grooves than in the bolt shown in Fig. 1.

Fig. 4 is a cross-section of Fig. 3.

Fig. 5 shows in elevation a bolt with interrupted grooves.

Fig. 6 is a cross-section on line 6—6 of Fig. 5.

Fig. 7 is a cross-section on line 7—7 of Fig. 5.

Fig. 8 shows a conical connecting bolt with longitudinal grooves.

Fig. 9 is a cross-section on line 9—9 of Fig. 8.

Fig. 10 is a cross-section on line 10—10 of Fig. 8.

Fig. 11 shows a bulged connecting bolt with longitudinal grooves.

Fig. 12 is a cross-section on line 12—12 of Fig. 11.

Fig. 13 is a cross-section on line 13—13 of Fig. 11.

Fig. 14 is a cross-section on line 14—14 of Fig. 11.

Fig. 15 shows a connecting bolt with helical grooves.

Fig. 16 is a cross-section on line 16—16 of Fig. 15.

Fig. 17 shows a rivet with longitudinal grooves.

Fig. 18 is a cross-section on line 18—18 of Fig. 17.

Fig. 19 shows a screw bolt with longitudinal grooves.

Fig. 20 is a cross-section on line 20—20 of Fig. 19.

Fig. 21 shows an eye-pin with longitudinal grooves.

Fig. 22 is a cross-section on line 22—22 of Fig. 21.

Fig. 23 shows a shaft end with longitudinal grooves.

Fig. 24 is a cross-section on line 24—24 of Fig. 23.

Fig. 25 shows a shaft end with polygonal pin and longitudinal grooves therein.

Fig. 26 is a cross-section on line 26—26 of Fig. 25.

According to the invention metallic connecting elements, such as rivets, screws, shafts and the like, are provided with longitudinal grooves, the width of which is narrower on the wall surface of the connecting element than at the base of the grooves. In Figs. 1 and 2 a smooth cylindrical connecting bolt $a^1$ is provided with longitudinal grooves $b$ in its wall, the width $c$ of these grooves being less at the outer surface of the bolt than the width $d$ at the base of the grooves. These grooves are produced, instead of by milling, by first drawing, rolling or pressing grooves of rectangular or similar cross section having a uniform width in the entire depth. By again drawing the connecting element thus grooved, or by radially pressing in the longitudinal strips of the wall remaining between the grooves, the outer groove edges of each groove are approached so that the groove width on the surface of the wall is narrowed. Thus, prismatic or so-called dove-tail-shaped grooves are formed.

Any number of grooves may be provided in the connecting element. In Figs. 3 and 4 eight grooves $b$ are distributed uniformly around the circumference of a bolt $a^2$.

In Fig. 5 the grooves $b$ are provided only at intervals on an undulated bolt $a^3$.

In Fig. 8 the grooves $b^4$ are provided on a conical connecting element $a^4$. This conical connecting element is produced by pressing rectangular grooves in a cylindrical metal body and by gradually increasing the pressure from the beginning to the end of the grooved metal cylinder during the pressing in of the metal strips remaining between the grooves, so that the outer edges of the grooves are gradually approached more and more and the depth of the grooves gradually becomes less towards the end of the metal cylinder. If the grooves are pressed in a conical metal body so that the base of the grooves extends parallel to the axis of the body, and if the remaining wall strips are pressed in with uniform pressure along the entire length, a conical connecting element is produced with grooves, the depth of which gradually decreases corresponding to the conicity of the connecting element and the width of which remains uniform along the entire length.

In a similar manner a bolt $a^5$ tapering from the middle towards both ends or bulged may be provided with grooves $b^5$ or produced from a cylindrical bolt, as shown in Figs. 11 to 14.

The grooves may also extend in helical shape around the wall of the connecting element, like the grooves $b^6$ on the cylindrical pin $a^6$ shown in Figs. 15 and 16.

Figs. 17 and 18 show a rivet $a^7$ with head and Figs. 19 and 20 a screw bolt $a^8$ with head and rectilineal grooves $b^7$ and $b^8$ respectively. If in one of the metal parts to be connected by means of the screw bolt $a^8$ a bore is provided which is of slightly smaller diameter than the smooth, grooved portion of the screw bolt, the grooves $b^8$ act as screw lock because the grooved portion of the bolt is tightly held like a rivet in the bore of the workpiece.

Fig. 21 shows an eye pin $a^9$ with grooves $b^9$. Such a pin can hold tightly in a suitable bore of a metal piece without screw thread connection and without riveting to a counter plate.

The connecting element shown in Fig. 23 is a shaft pin $a^{10}$ with rectilineal grooves $b^{10}$. If, for example, a disc is to be fitted on the shaft, it can be connected as tightly by means of the grooved pin as if it were keyed thereon.

Fig. 25 shows a similar example of a connecting element, with the difference that the shaft pin $a^{11}$ is of polygonal cross section. The effect, when driving into the workpiece, is the same as with the connecting element according to Fig. 23.

There are many connecting elements for which the arrangement of grooves according to the invention can be advantageously employed and which come within the scope of the invention.

I claim:—

1. A metallic connecting element, comprising a bolt of any desired cross-section having a smooth wall surface with a plurality of dove-tail-shaped longitudinal grooves formed therein, the outer edges of said dove-tailed grooves forming, with the adjacent edges of the longitudinal portions of the bolt, oppositely disposed sharp longitudinal ribs defining sharp edged incisions extending longitudinally of the bolt, the longitudinal rib portions of the bolt adapted to be radially upset at said sharp edged incisions when the bolt is driven into a hole of similar shape to but of smaller cross-section than the bolt.

2. A metallic connecting element, comprising a bolt of any desired cross-section and with a smooth wall having a plurality of dove-tail-shaped longitudinal grooves, the depth of said grooves and the width at their outer edges gradually decreasing from end to end of the bolt, the outer edges of said dove-tailed grooves forming, with the adjacent edges of the longitudinal portions of the bolt, oppositely disposed sharp longitudinal ribs defining sharp edged incisions extending longitudinally of the bolt, the longitudinal rib portions of the bolt adapted to be radially upset at said sharp edged incisions when the bolt is driven into a hole of similar shape to but of smaller cross-section than the bolt.

3. A metallic connecting element, comprising a bolt of any desired cross-section having a smooth wall surface with a plurality of dove-tail-shaped longitudinal grooves, the depth of said grooves and the width at their outer edges gradually decreasing from the middle of the length of the bolt to the ends thereof, the outer edges of said dove-tailed grooves forming, with the adjacent edges of the longitudinal portions of the bolt, oppositely disposed sharp longitudinal ribs defining sharp edged incisions extending longitudinally of the bolt, the longitudinal rib portions of the bolt adapted to be radially upset at said sharp edged incisions when the bolt is driven into a hole of similar shape to but of smaller cross-section than the bolt.

4. A metallic connecting element, comprising a bolt of any desired cross-section having a smooth wall surface with a plurality of dove-tailshaped longitudinal grooves extending in helical shape along the wall surface of the bolt, the outer edges of said dove-tailed grooves forming, with the adjacent edges of the longitudinal portions of the bolt, oppositely disposed sharp longitudinal ribs defining sharp edged incisions extending longitudinally and helically of the bolt, the longitudinal and helical rib portions of the bolt adapted to be radially upset at said sharp edged incisions when the bolt is driven into a hole of similar shape to but of smaller cross-section than the bolt.

OSKAR EWALD WERNER OSENBERG.